June 12, 1945.  W. O. LUERTZING  2,378,146
APPARATUS FOR SEALING GLASS TUBES
Filed May 20, 1943  2 Sheets-Sheet 1

INVENTOR.
Walter O Luertzing
BY Pennie Davis Marvin Edmonds

June 12, 1945.  W. O. LUERTZING  2,378,146
APPARATUS FOR SEALING GLASS TUBES
Filed May 20, 1943  2 Sheets-Sheet 2
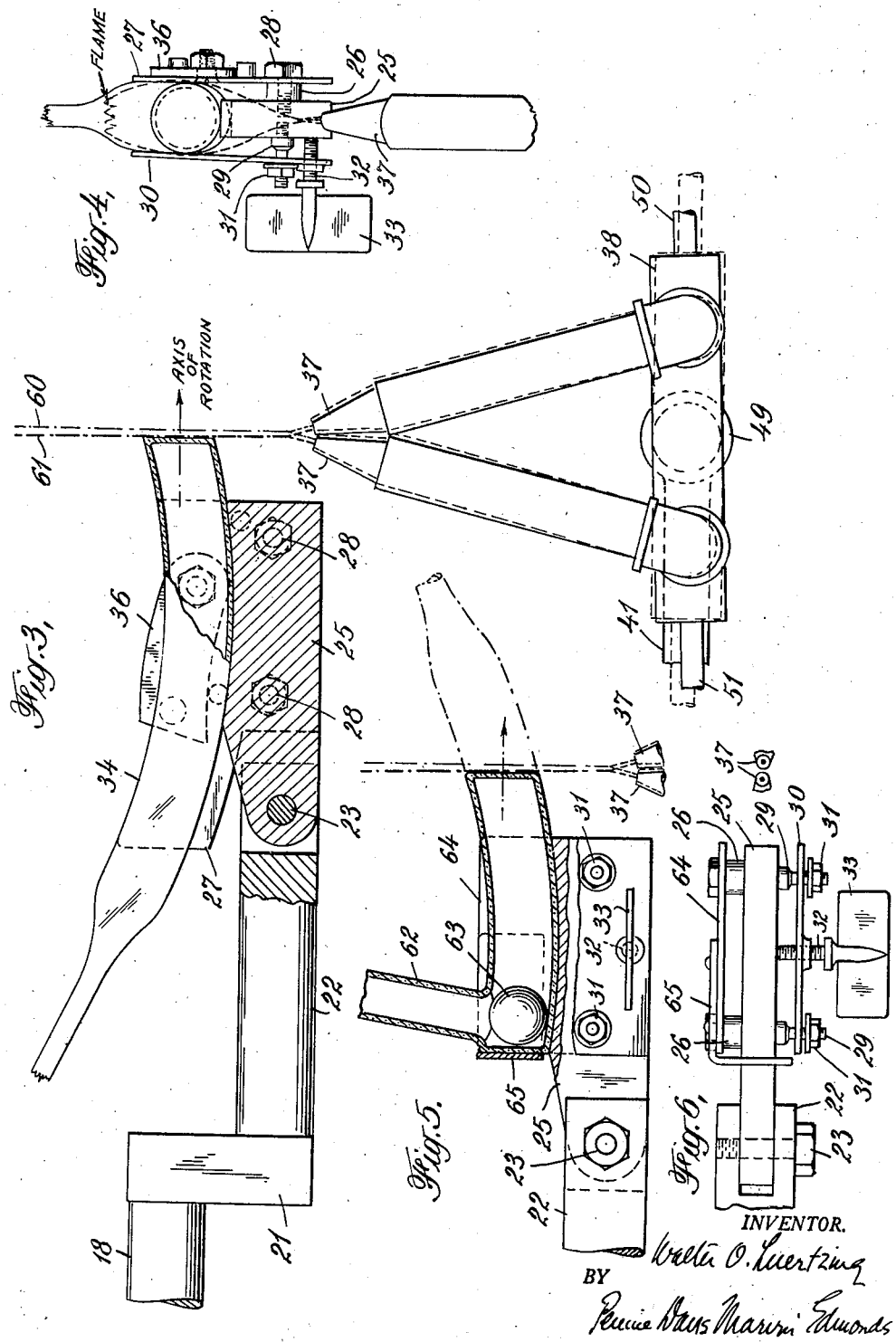
INVENTOR.
Walter O. Luertzing
BY
Pennie Davis Marvin Edmonds Patented June 12, 1945

2,378,146

UNITED STATES PATENT OFFICE 2,378,146

APPARATUS FOR SEALING GLASS TUBES

Walter O. Luertzing, Vineland, N. J., assignor to E. Machlett & Son, New York, N. Y., a corporation of New York Application May 20, 1943, Serial No. 487,731

6 Claims. (Cl. 49—7)

This invention relates to the cutting and sealing of glass tubes and is concerned more particularly with a novel apparatus by the use of which a glass tube may be cut between its ends and sealed at the cut with a closure which is substantially flat and lies in a plane which may extend at an angle to the axis of the tube. The apparatus of the invention may be used for cutting and sealing tubes as such, tubular extensions or necks of vessels, and various other hollow glass objects, but since the invention may be employed to especial advantage in the production of inclinometers, its application for that purpose will be illustrated and described in detail by way of explanation.

Inclinometers, now used as part of turn and bank indicators for airplanes, include a sealed glass tube which is curved and contains a ball immersed in oil. The tube is mounted in the instrument with its concave side uppermost and, when the plane is in straight flight on an even keel or is making a turn with proper bank, the ball lies centrally of the tube at the lowest point of the curve. If the plane starts to fly straight but with one wing down or to make a curve with too much or too little bank, the ball will run to one end or the other of the tube and thus indicate the situation to the pilot. Such inclinometers are made under rigid specifications and the length of the tube between closures must be accurate within a small tolerance, and the closures must be flat and parallel and must extend at the proper angle to the axis of the tube so that they will lie vertical in the device as installed. Also, the tube is provided with a tubulation to permit the oil to be introduced and sealed in and the tubulation must extend upward from the concave surface of the tube near one end with its axis radial.

Inclinometers have heretofore been made by hand and, by manual operations, it is extremely difficult to cut and seal the curved tube at its ends with closures which meet the specified requirements. Because of such difficulties, the manufacture of the devices by hand is expensive not only because of the labor required for production and testing but also because of the large proportion of devices rejected as unsatisfactory.

The present invention is, accordingly, directed to the provision of an apparatus by which a glass tube may be cut accurately to length and sealed at its ends with closures lying at selected angles, such as an oblique angle, to the axis of the tube. By the use of the invention, inclinometers of the construction and limitations previously mentioned can be made rapidly and accurately and with substantial savings not only in actual cost of manufacture but also in reduced loss from rejections.

The apparatus of the invention comprises means for clamping the tube and rotating the clamp and tube in such manner that the axis of rotation passes through the central plane of the desired closure of the tube and extends normal to that plane. Associated with the rotary clamp are burner means by which a thin planar flame may be directed against the surface of the tube along the line where the plane of the desired closure cuts the tube wall and the burner and clamped tube may be moved relative to one another in a direction lengthwise of the tube in order to complete the sealing, as will be presently described. The apparatus includes other features which simplify its use and insure production of an acceptable product.

For a better understanding of the invention, reference may be had to the acompanying drawings in which Fig. 1 is a view of the apparatus in side elevation;

Fig. 3 is a fragmentary sectional view on the line 3—3 of Fig. 2;

Fig. 4 is an end view of the complete assembly shown in Fig. 3;

Fig. 5 is a view in side elevation with parts broken away of a modified clamp; and Fig. 6 is a plan view of the features shown in Fig. 5.

Figure 1:
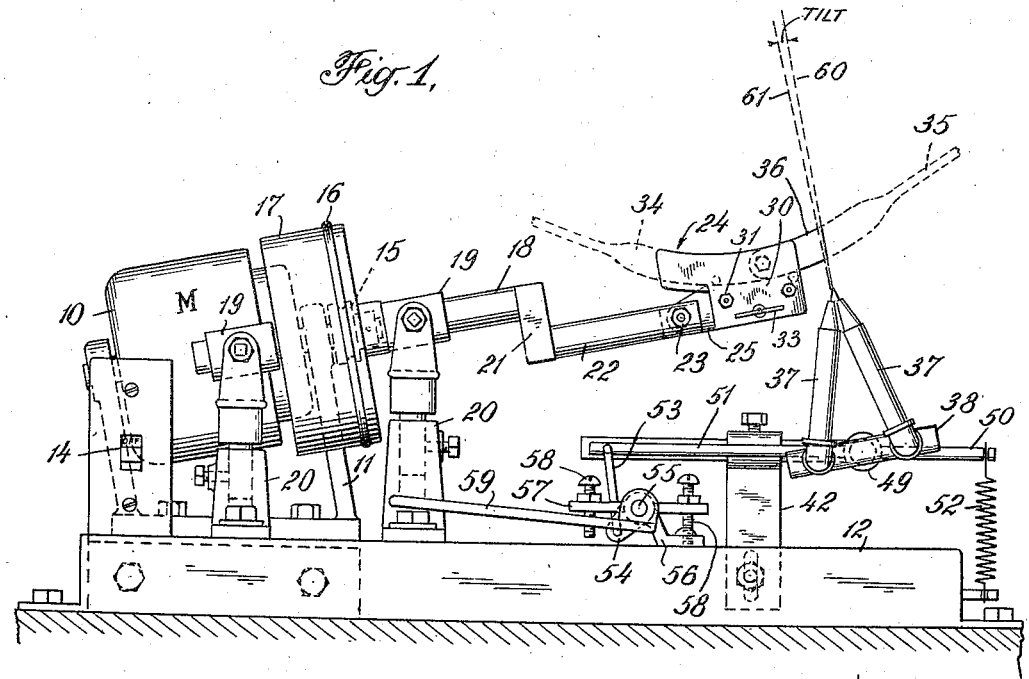
Figure 2:
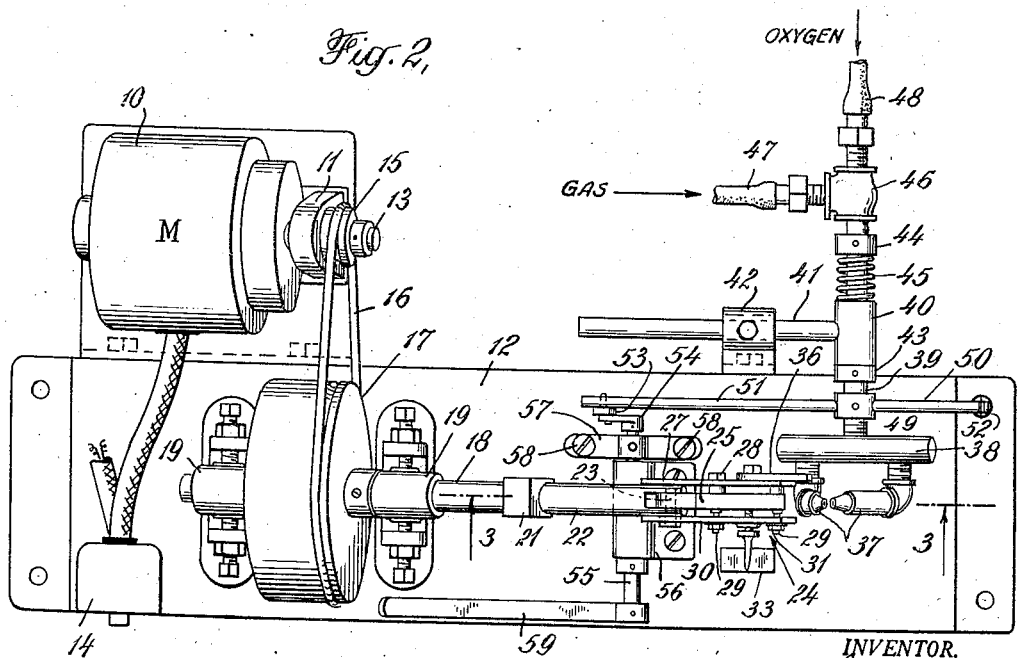
Fig. 2 is a plan view of the apparatus.

As shown in the drawings, the apparatus as illustrated comprises a motor 10 mounted in a support 11 on a base 12, the support illustrated being so constructed that the motor shaft 13 lies at an angle to the horizontal with its free end higher. The motor is controlled by a switch 14 mounted on the base and has a pulley 15 on its shaft about which is entrained a belt 16. The belt drives a pulley 17 on a shaft 18 mounted in bearings 19 in standards 20 attached to the base. The standards are so constructed that the shaft 18 extends at an angle to the horizontal similar to the angle of the motor shaft, and the standards are capable of adjustment so as to vary the angle of shaft 18 to a limited extent. The pulley 17 lies between the bearings 19 and it has a groove for the belt 16 and a wide face at one side of the groove, so that it can be rotated by hand, when desired.

The shaft 18 is provided at one end with a crank 21, from the end of which extends a second shaft 22 lying parallel to shaft 18 and offset therefrom. Attached to the free end of the second shaft 22 by a bolt 23 is a clamp generally designated 24. The clamp includes a central bar 25 secured to shaft 22 by the bolt and provided with a pair of lateral bosses 26, to the ends of which a plate 27 is rigidly held by bolts 28 threaded through the plate and the bosses and into plate 25. The plate extends upward above the top surface of the bar and serves as one jaw of the clamp.

Threaded into the opposite face of bar 25 are a pair of studs 29 which have threaded ends extending loosely through openings in a plate 30 generally similar to plate 27. The studs are provided with nuts and washers 31 on their outer ends beyond the plate 30. A bolt 32 with a finger plate 33 at its outer end is threaded through plate 30 to bear against the side of bar 25 and by manipulation of the bolt, the plate 30 may be tilted on the studs so that the upper edge of the plate approaches or recedes from the plate 27. The top surface of the bar 25 is curved to conform to the curvature of the tube to be cut and sealed and, when such a tube is seated on the bar, it may be clamped between the plates 27 and 30, as above described.

The tubes to be formed into inclinometers are of the shape indicated at 34, each tube having a curved central portion and pointed ends 35. In the preparation of the tubes, they are cut from lengths of tubing and pointed and bent as shown. Thereafter, a mark is placed on each tube to indicate one place where it is to be cut and sealed. The pointed tube is then placed in the clamp and a gauge 36, which is pivoted on plate 27, is swung outward beyond the free end of the clamp and the tube adjusted so that the mark is aligned with the end of the gauge. The tube is then clamped in this position, after which the gauge is swung back out of the way and to the position shown in Fig. 3.

The heating of the tube for cutting and sealing purposes is effected by burner means by which a planar flame is directed on the tube. This burner means comprises a pair of burners 37 which are inclined toward one another so that the flames issuing therefrom impinge on one another and produce the thin flat flame desired. The burners are supplied with a mixture of oxygen and combustible gas through a manifold 38 mounted on the end of a tube 39, which is supported in a sleeve 40 attached to a bar 41 clamped in a support 42. The tube 39 is provided with collars 43 and 44 lying on opposite sides of the sleeve 40 and a spring 45 encircling the tube bears against sleeve 40 and collar 44 and holds the tube with collar 43 bearing snugly against the sleeve 40. The tube 39 is provided with a T 46 to which supplies of gas and oxygen are delivered through tubes 47, 48, respectively.

The tube 39 is provided with a collar 49 between collar 43 and manifold 38 and a pair of rods 50, 51 are mounted in collar 49. Rod 50 is acted on by a spring 52 secured to the end of the rod and to a fixed part of the base, while rod 51 is connected by a link 53 to a crank 54 on a shaft 55 mounted in a bearing on a suitable bracket 56 on the base. The shaft is provided with a pair of diametrical arms 57 having screws 58 in their ends and, when the shaft is rocked, one or the other of the screws strikes the base 12 and limits the rocking movement. Shaft 55 is also provided with a crank arm 59 by which the shaft can be rocked and when the shaft is thus swung by arm 59 against the action of spring 52, it acts through link 53 to swing collar 49, manifold 38, and burners 37 to shift the plane of the flame issuing from the burners to a slight extent in a direction lengthwise of the tube.

In the use of the apparatus, the operator places the tube 34 in clamp 24, centering the tube by the use of the gauge 36 and clamping the tube firmly in position. The shape of the top of bar 25 of the clamp conforms to the convex curvature of the tube to be treated and the clamp is adjusted about the axis of bolt 23 so that the axis of shaft 18, which is the axis of rotation, passes through the center of the plane of the desired closure of the tube and is normal to that plane. With the parts in this condition, the burners are turned up and the motor is started to cause the tube to be rapidly rotated while the thin, flat flame from the burners strikes the outside of the tube. In the initial heating the burners are tilted clockwise by the action of spring 52 and the flame, the plane of which is indicated by the dotted line 60, strikes the outside of the tube along the line where the plane of the tube closure intersects the wall. When the tube has been heated so that the glass has become plastic along the line of heating, the motor is stopped and pulley 17 is rotated slowly by hand while the heating continues.

When the tube has been heated to the desired extent, the operator pulls out the pointed end of the tube to the right of the flame, as shown in Fig. 1, and in this operation, the softened glass walls draw together in the plane of the flame.

Thereafter, the burner is shifted slightly to the left by depression of arm 59 and the motor is started again. The tilting of the burner causes the plane of the flame to shift to the position indicated by the dotted line 61, so that the end of the tube is heated slightly inward from the plane of the cut. As the heating and revolution of the tube continue, the glass from the tube wall runs together to form a flat closure which seals the end of the tube and is of uniform thickness equal to that of the tube wall. The flame helps keep the closure flat and by revolving the tube at the proper speed, the softened glass is kept from being drawn outward centrifugally. When the closure is finished, the arm 59 is released and the burners are turned down. The clamp is then opened and the tube, now sealed at one end, is transferred to the operator who applies a tubulation 62.

The tubulation is attached by usual glass blowing methods to the side of the tube adjacent the previously sealed end and thereafter, the tube is returned to the sealing apparatus. A ball 63 is then inserted in the tube through its open end and the tube is again mounted in a clamp and its open end cut and sealed in the manner previously described. The clamp used in the second operation is generally similar to that previously described, except that the rigid plate 64, corresponding to plate 27, is provided with a gauge plate 65 which extends across the lower end of the clamp. When the tube is placed in the clamp with its sealed end abutting plate 65, it lies in proper relation to the flame to insure that the other end of the tube will be cut and sealed at the desired place. After the second sealing operation has been completed, the tube is transferred to the operator who introduces the oil through the tubulation and then seals the latter by customary methods.

The apparatus described is constructed especially for the production of inclinometers and, for that reason, the motor and shaft 18 are mounted at an angle to the horizontal, so that, when a tube, sealed at one end and containing a ball, is placed in the clamp against plate 65, the ball will lie at the lower end of the tube against the sealed end and will not interfere with the sealing and closing of the other end. If the apparatus were to be employed for other purposes, the motor and shaft 18 might be mounted at an angle to the horizontal for convenience, but ordinarily the motor and shaft would be mounted in such position that the plane on which the tube is cut would be vertical, since this would facilitate the inward flowing of the molten glass to form the end wall and complete the seal.

The clamp illustrated and described is constructed for use in sealing tubes of a particular size and curvature. As will be apparent, the apparatus is not limited in its utility to operation on tubes of a particular type but for handling tubes of other than the curved shape shown or glass objects of other shapes, appropriate changes in the clamping means and its mounting may be necessary.

The apparatus of the invention may be employed in the cutting and sealing of hollow glass articles of various types and such articles may have the form of tubes, tubulations or necks of vessels, and other shapes. For convenience, I have identified such articles in the appended claims as "tubes," but it is to be understood that this term is not limited to tubes as such but is intended to apply to other hollow glass objects.

I claim:

1. An apparatus for cutting a glass tube between the ends and sealing the tube at the cut with a flat closure, which comprises a generally horizontal shaft mounted for rotation, a second shaft attached at one end to the first shaft and lying parallel to and offset from the first shaft, a clamp for holding a tube extending generally lengthwise of the shafts and with one end projecting beyond the free end of the second shaft, means for securing the clamp to the second shaft in different positions of adjustment about an axis normal to that of the second shaft, burner means producing a planar flame adapted to intersect said projecting end of the clamped tube, the plane of the flame lying transverse to the axis of the second shaft, and means for moving the burner means to a limited extent to shift the planar flame along the clamped tube.

2. An apparatus for cutting a glass tube between its ends and sealing the tube at the cut with a flat closure, which comprises a generally horizontal shaft mounted for rotation, a second shaft attached at one end to the first shaft and lying parallel to and offset from the first shaft, a clamp including holding elements for holding a tube extending generally lengthwise of the shafts and with one end projecting beyond the free end of the second shaft, means for securing the clamp to the second shaft with the holding elements extending substantially parallel to a plane through the axis of the shafts, the clamp being adjustable to different positions about an axis normal to that of the second shaft, burner means producing a planar flame adapted to intersect said projecting end of the clamped tube, the plane of the flame lying transverse to the axis of the second shaft, and means for moving the burner means to a limited extent to shift the planar flame along the clamped tube.

3. An apparatus for cutting a glass tube between its ends and sealing the tube at the cut with a flat closure, which comprises a generally horizontal shaft mounted for rotation, a second shaft attached at one end to the first shaft and lying parallel to and offset from the first shaft, a clamp for holding a tube extending generally lengthwise of the shafts and with one end projecting beyond the free end of the second shaft, means for securing the clamp to the second shaft in different positions of adjustment about an axis normal to that of the second shaft, burner means for producing a planar flame intersecting said projecting end of the clamped tube, the plane of the flame lying transverse to the axis of the second shaft, a mounting for the burner means on which the burner means may be tilted about an axis offset from and substantially normal to the axis of the second shaft, and means for tilting the burner means on said mounting to cause the flame to shift along the clamped tube.

4. An apparatus for cutting a glass tube between its ends and sealing the tube at the cut with a flat closure, which comprises a generally horizontal shaft mounted for rotation, a second shaft attached at one end to the first shaft and lying parallel to and offset from the first shaft, a clamp for holding a tube extending generally lengthwise of the shafts and with one end projecting beyond the free end of the second shaft, means for securing the clamp to the second shaft in different positions of adjustment about an axis normal to that of the second shaft, burner means for producing a planar flame adapted to intersect said projecting end of the clamped tube, the plane of the flame lying transverse to the axis of the second shaft, a mounting for the burner means on which the burner means may be tilted about an axis offset from and substantially normal to the axis of the second shaft, means acting on the burner means and tending to hold said means with the flame in an initial position, and means for tilting the burner means to shift the flame to a second position.

5. An apparatus for cutting a glass tube between its ends and sealing the tube at the cut with a flat closure, which comprises a generally horizontal shaft mounted for rotation, a second shaft attached at one end to the first shaft and lying parallel to and offset from the first shaft, a clamp for holding a tube extending generally lengthwise of the shafts and with one end projecting beyond the free end of the second shaft, means for securing the clamp to the second shaft in different positions of adjustment about an axis normal to that of the second shaft, a pair of burners secured together and producing flames merging to form a planar flame, the plane of which intersects said projecting end of the clamped tube and lies transverse to the axis of the second shaft, a mounting for said burners on which they may be tilted about an axis offset from and normal to the axis of the second shaft, a spring acting on the connected burners and tending to hold them in one position, and means connected to the burners and operable to swing them to a second position against the action of said spring.

6. An apparatus for cutting a glass tube between its ends and sealing the tube at the cut with a flat closure, which comprises a generally horizontal shaft mounted for rotation on bearings, a crank arm at one end of the shaft, a second shaft mounted at one end in the free end of the arm and lying parallel to the first shaft, a clamp for holding a tube extending generally lengthwise of the shafts and with one end projecting beyond the free end of the second shaft, means for securing the clamp to the free end of the second shaft for adjustment to different positions about an axis normal to that of the second shaft, a pair of burners connected together and producing flames merging into a planar flame adapted to intersect said end of the clamped tube, and a mounting on which the burners are tiltable about an axis offset from and normal to the axis of the second shaft.

WALTER O. LUERTZING.